United States Patent
Hu et al.

(10) Patent No.: US 6,725,181 B2
(45) Date of Patent: Apr. 20, 2004

(54) METHOD AND SYSTEM FOR COLLECTING AND MONITORING SHOP FLOOR INFORMATION

(75) Inventors: Shiyu Hu, Shenzhen (CN); Youfu Lee, Shenzhen (CN); Dong Shang, Shenzhen (CN); MingZhu Xiu, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 180 days.

(21) Appl. No.: 09/962,753

(22) Filed: Sep. 24, 2001

(65) Prior Publication Data

US 2002/0198686 A1 Dec. 26, 2002

(30) Foreign Application Priority Data

Jun. 8, 2001 (TW) .................................... 90113910 A

(51) Int. Cl.[7] .............................................. G06F 19/00
(52) U.S. Cl. ........................................... 702/188; 700/9
(58) Field of Search ................... 702/188, 33, 35, 702/118, 122, 182, 183, 184, 187; 700/1, 9, 17, 95, 108, 169

(56) References Cited

U.S. PATENT DOCUMENTS

| | | | | |
|---|---|---|---|---|
| 6,408,218 B1 | * | 6/2002 | Hallahan et al. | 700/102 |
| 6,463,352 B1 | * | 10/2002 | Tadokoro et al. | 700/169 |
| 6,564,154 B1 | * | 5/2003 | Zimmerman et al. | 702/24 |

* cited by examiner

Primary Examiner—Marc S. Hoff
Assistant Examiner—Edward Raymond
(74) Attorney, Agent, or Firm—Wei Te Chung

(57) ABSTRACT

A method and system 1 are provided for collecting and monitoring shop floor information. In this method and system, a shop floor information collector 108 and a working machine 107 are provided to each production line for collecting real time information, such as real time output 2022, defective product category and quantity 2024, working status 2028, and the like. A central management unit 20 is provided to store and process received data. The central management unit can obtain outside data by a communication network 2 and may be accessed by a plurality of clients 5. A monitoring module 30 is provided to detect defective data on production lines and send an alarm signal to a repair station.

20 Claims, 8 Drawing Sheets

| Machine Code | Product Code | Product Name | Manufacturing Order | Planning Output | Real Time Output | ... | Defective Product Quantity | Machine Status | Working Status |
|---|---|---|---|---|---|---|---|---|---|
| ... | ... | ... | ... | ... | ... | ... | ... | ... | ... |
| A07 | 2M513-003C | ... | WEM-110240 | 1700 | 983 | ... | 8 | Producing | Normal |
| A08 | | | | | | | | Waiting | No Arrangement |
| ... | ... | ... | | | | ... | | ... | ... |
| B07 | | ... | | | | ... | | Waiting | Testing |
| B08 | 2M516-003C | ... | WEM-110251 | 6000 | 3900 | | 0 | Producing | Normal |
| ... | ... | ... | | | | | | ... | ... |

METHOD AND SYSTEM FOR COLLECTING AND MONITORING SHOP FLOOR INFORMATION

BACKGROUND OF THE INVENTION

1. Field of the Invention

The invention relates generally to automated means for obtaining and managing shop floor information, and more particularly, to methods and systems that automatically integrate and analyze collected information and produce related data tables and alarm signals of abnormal status.

2. Description of Related Art

With rapid development of information technologies such as web technology, relational database management systems (RDMSs), and graphical user interfaces (GUIs), enterprises can computerize their workflow and integrate different information much easier than ever before. This assists the operation of shop floors and improves the performance of production, procurement and sales.

However, in many manufacturing production lines, production information is still largely collected and handled by non-automated means. Generally, a person in charge of a production line fills in one or several data tables, and hands the tables to analysts who process the information contained in the tables. This process is time-consuming and tedious for all persons involved. Some data tables contain information about numerous different conditions and objectives. Many tables are so large that it becomes difficult to locate the desired data, let alone effectively analyze it.

In addition, in a large enterprise, numerous data tables from different departments need to be collected and coordinated by the analysts. As a result, some problems evidenced in the tables in combination cannot be found easily or at all. Derivative tables produced during the processing of information frequently become large and unwieldy.

Furthermore, certain time-critical information such as real time output, usage of production capability, abnormal stoppages on production lines and errors in working machines needs to be processed expeditiously. These issues cannot always be promptly identified and resolved.

Finally, non-automated systems are most vulnerable to the vagaries of human error, both in the content of data provided and the speed with which it is delivered. Analyzing of the data is similarly prone to error and delay.

Accordingly, what is needed is a method and system which can automatically collect and analyze information, produce related data tables, and send alarm signals in cases of abnormal status. What is also needed is a method and system that can rapidly identify and solve problems on production lines.

SUMMARY OF THE INVENTION

It is a primary object of the present invention to provide a shop floor information collecting and monitoring system for automatically collecting real time shop floor information and monitoring abnormal status.

It is another object of the present invention to provide a shop floor information collecting and monitoring method of automatically collecting real time shop floor information and monitoring abnormal status.

It is still another object of the present invention to provide a shop floor information collecting and monitoring system which automatically produces related data tables and alarm signals of abnormal status.

It is yet another object of the present invention to provide a shop floor information collecting and monitoring system which simplifies management procedures and improves production efficiency.

The present invention achieves the above objects and solves the foregoing problems by providing a system for collecting and monitoring shop floor information and providing a method for using the same.

In one aspect of the present invention, there is provided a system which can collect and monitor real time shop floor information and produce related data tables and alarm signals of abnormal status. The system comprises a plurality of real time information collectors for producing a first signal about production procedure and working status at a shop floor, a plurality of working machines that can automatically produce a second signal, an information collecting computer that is connected with the real time information collectors and the working machines and that automatically converts the first and second signals into computer-readable data, a monitoring module for monitoring shop floor information, and a central management unit for storing and processing the computer-readable data. The central management unit includes an interface that enables an operator to manually input periodic production schedule information and allows the operator to search for and obtain information therefrom.

In another aspect of the invention, there is provided a method of collecting and monitoring real time shop floor information and producing related data tables and alarm signals of abnormal status. The method provides a plurality of real time information collectors for producing a first signal about production procedure and working status at a shop floor, a plurality of working machines that can automatically produce a second signal, an information-collecting computer that is connected with the real time information collectors and the working machines and that automatically converts the first and second signals into computer-readable data, a monitoring module for monitoring shop floor information, and a central management unit for storing and processing the computer-readable data. The central management unit includes an interface that enables an operator to manually input periodic production schedule information and allows the operator to search for and obtain information therefrom.

These and other objects, features, and advantages of the present invention will become more fully apparent from the following description and appended claims, or may be learned by practice of the invention as set forth hereinafter.

BRIEF DESCRIPTION OF THE DRAWINGS

The invention will be described and explained with additional specificity and detail through the use of the accompanying drawings, in which:

FIG. 6 is an illustrative view of a concurrent data display of the central management unit of FIG. 1.

DETAILED DESCRIPTION OF THE PREFERRED EMBODIMENT

Figure 1:
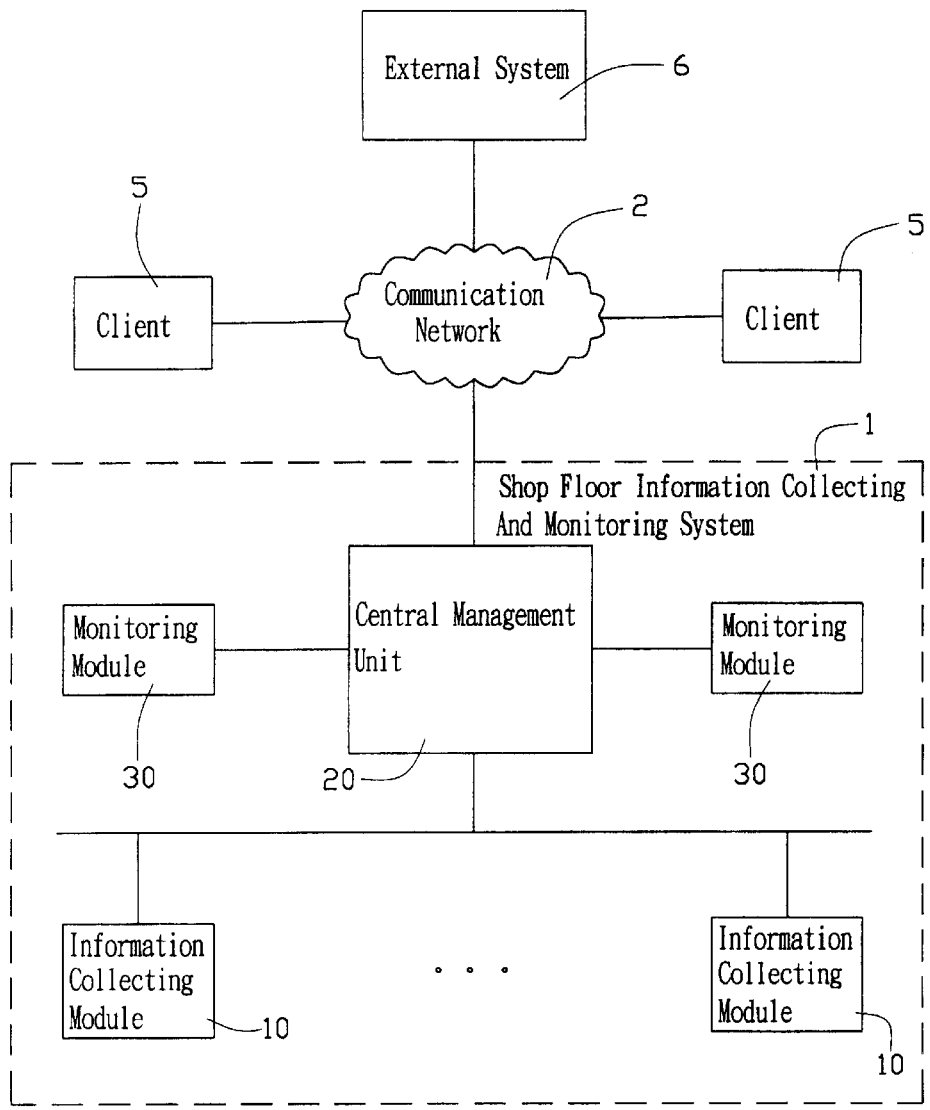
FIG. 1 is a block diagram showing a system for collecting and monitoring shop floor information according to a preferred embodiment of the present invention.

A preferred embodiment of an information collecting and monitoring system and method according to the present invention will now be described referring to the drawings.

FIG. 1 shows a shop floor information collecting and monitoring system 1 according to the present invention. The shop floor information collecting and monitoring system 1 includes a plurality of information collecting modules 10 for collecting shop floor information, a central management unit 20 connected to the information collecting modules 10 for storing and processing the collected information, and a plurality of monitoring modules 30 connected to the central management unit 20 for monitoring the shop floor information and automatically producing alarm signals indicating error on production lines or working machines. The shop floor information collecting and monitoring system 1 can also interchange data with an external system 6 by a communication network 2 which may be the Internet or an intranet. A plurality of clients 5 can access the central management unit 20 and obtain real time information about the shop floor via the communication network 2.

Figure 2:
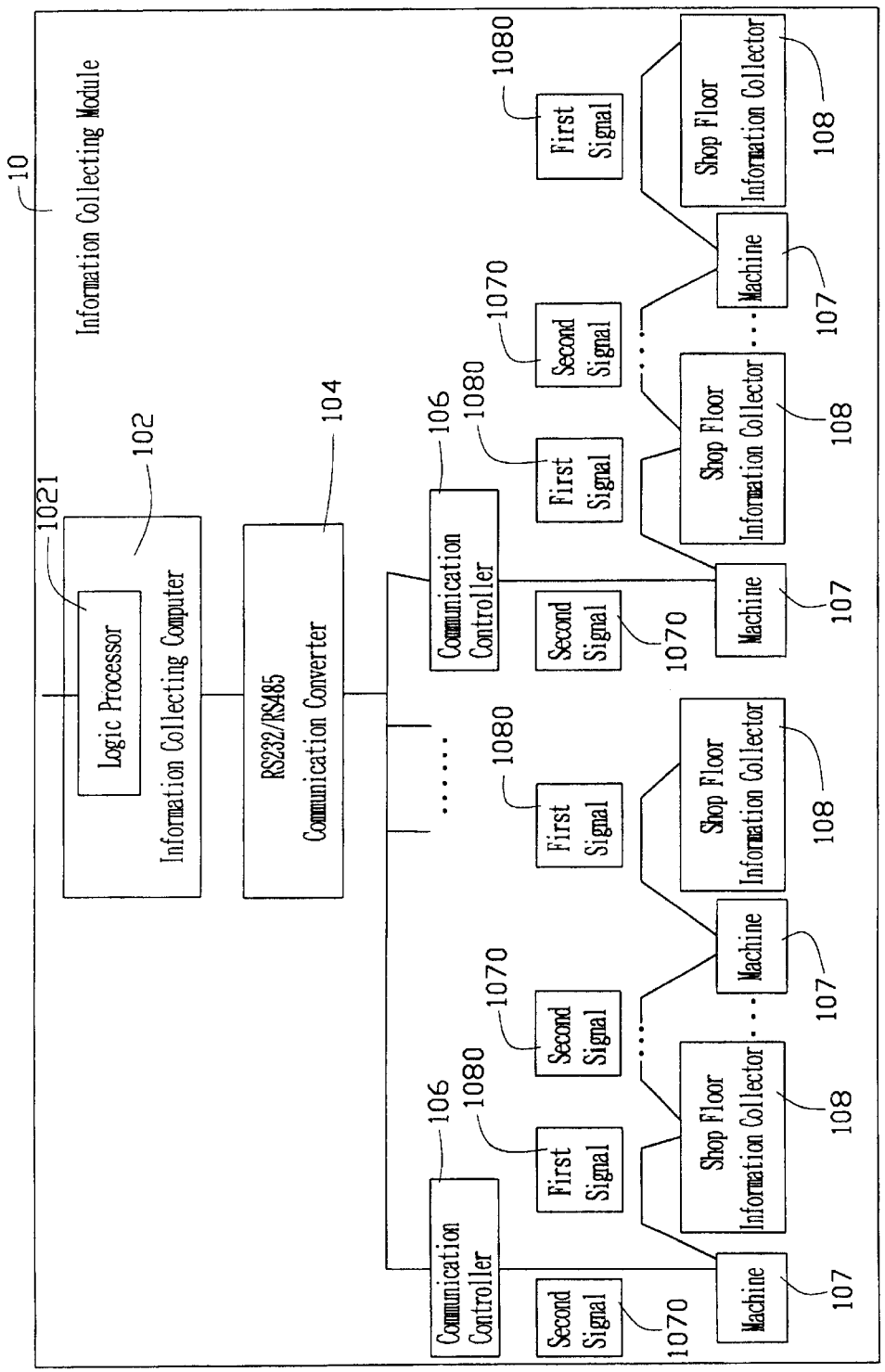
FIG. 2 is a schematic diagram of an information-collecting module of the system of FIG. 1.

FIG. 2 is a schematic diagram of the information collecting module 10. The information collecting module 10 comprises a plurality of working machines 107 which may be of different categories or sizes, a plurality of shop floor information collectors 108 physically located in front of the working machines 107, and an information collecting computer 102.

The information collecting module 10 further comprises an RS232/RS485 communication converter 104, and a plurality of communication controllers 106 which connect the working machines 107 and the shop floor information collectors 108 with the information collecting computer 102.

Each shop floor information collector 108 can produce a first signal 1080 that contains real time information about the working machine 107. The first signal 1080 includes information about production procedure, working status and defective product category and quantity. An operator manually inputs such information into the shop floor information collector 108 via an operation board (see FIG. 3).

Each working machine 107 can automatically produce a second signal 1070 that includes real time output of the working machine 107 obtained from an automated counter or similar device (not shown in FIG. 2).

The RS232/RS485 communication converter 104 and the communication controller 106 are utilized to connect the working machines 107 and the shop floor information collectors 108 with the information collecting computer 102. The communication controller 106 obtains real time signals and identifies which working machine and which shop floor information collector sent the signals.

The information-collecting computer 102 includes a logic processor 1021 that translates the real time signals into computer-readable data.

Figure 3:
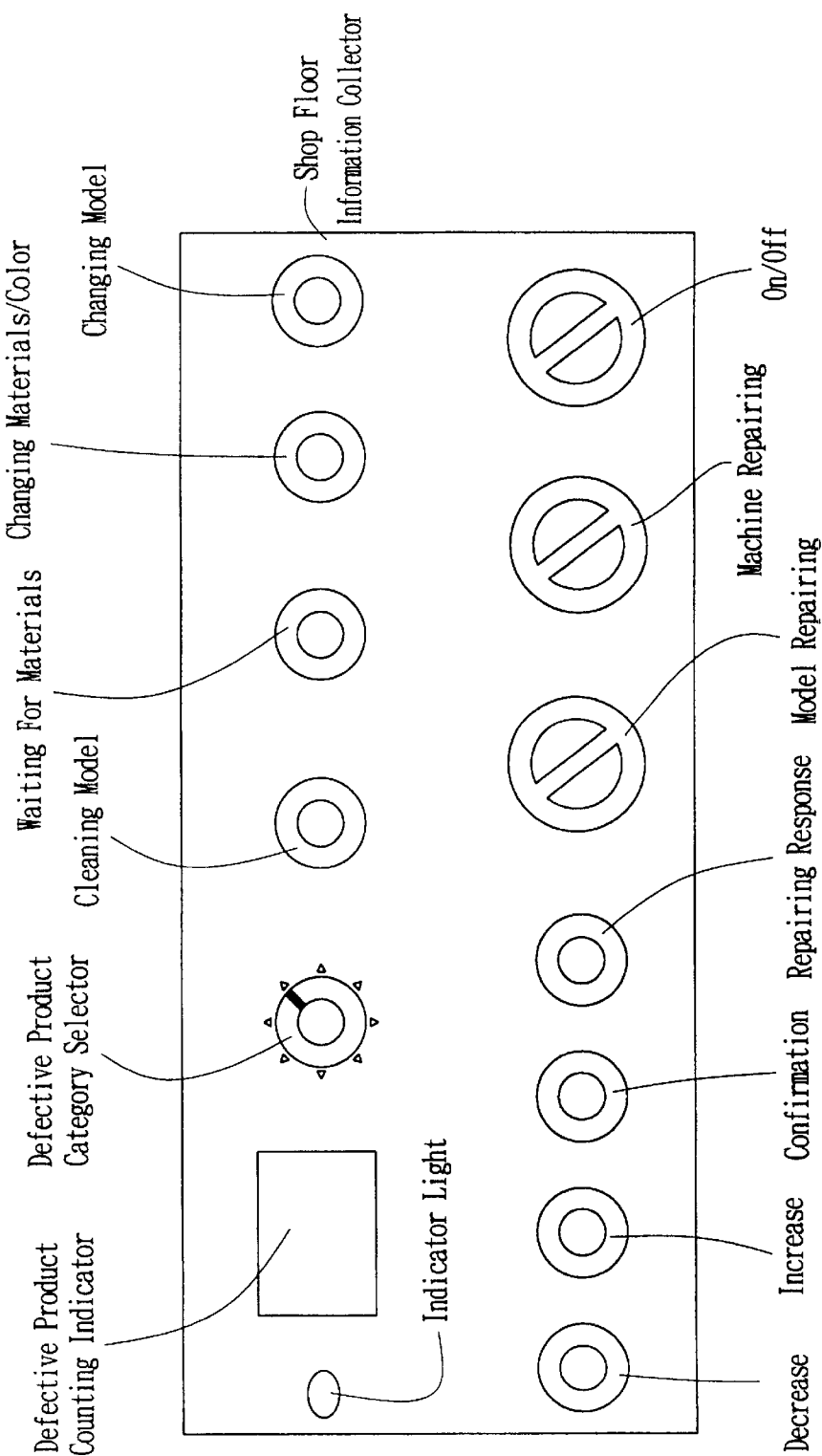
FIG. 3 is a schematic view of an operation board of a shop floor information collector in the information-collecting module of FIG. 2.

FIG. 3 is a schematic diagram of an operation board of the shop floor information collector 108. The operation board includes a plurality of function buttons, a defective product counting indicator, a defective product category selector, and an indicator light.

The function buttons include an on/off button that is utilized to initialize the shop floor information collector 108 when the production line begins to work, a cleaning model button for when the production line stops working in order to clean a model, a waiting for materials button for when the production line stops working while waiting for materials, a changing materials/color button for when the production line stops working for changing of materials or color, a changing model button for when the production line stops working in order to change a model, a machine repairing button and a model repairing button for indicating there is a machine or a model needing repair on a production line, a repairing response button that is utilized to respond to a repairing requirement once a repair technician has arrived on site to effect a repair, an increase button and a decrease button that are utilized to input defective product quantities, and a confirmation button that is utilized to confirm defective product quantities.

The defective product counting indicator is utilized to show defective product quantities.

The defective product category selector is provided to select any defective product category that has been defined according to the products being produced on the shop floor.

Figure 4:
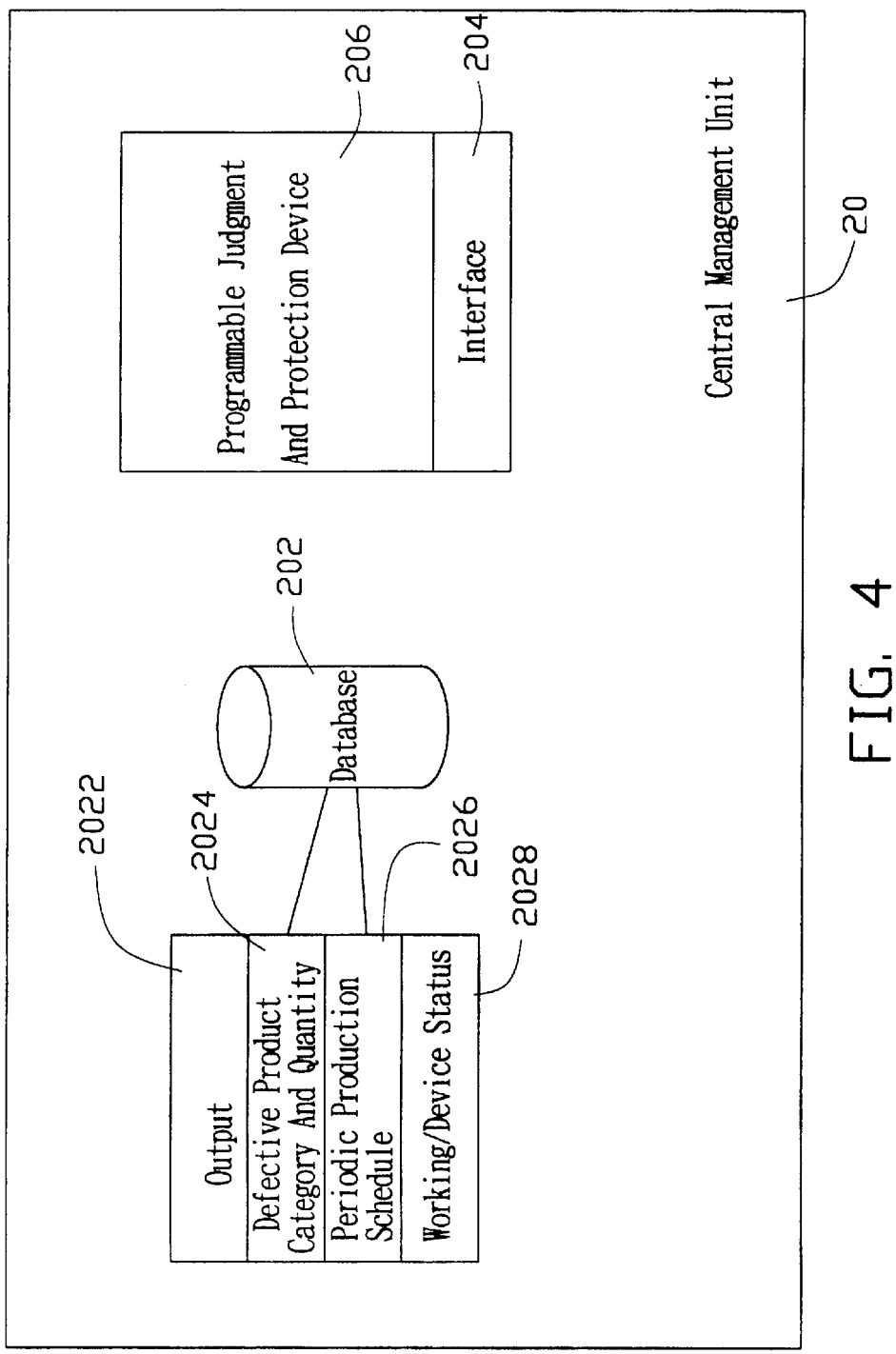
FIG. 4 is a schematic diagram of a central management unit of the system of FIG. 1.

FIG. 4 is a block diagram of the central management unit 20 shown in FIG. 1. The central management unit 20 can store and process the received data. The central management unit 20 comprises a database 202 that is an open relational database, such as Microsoft SQL Server. The database comprises a set of data including output 2022, defective product category and quantity 2024, periodic production schedule 2026, and working/device status 2028. The output 2022 and the defective product category and quantity 2024 are defined according to different departments within the organization and different products being produced on the shop floor. The periodic production schedule 2026 is manually input by a production planner according to actual requirements of the organization. The working/device status 2028 includes the following four different conditions:

| working/machine status | detailed specification |
| --- | --- |
| producing | normal |
|  | producing without manufacturing order |
|  | producing not in accordance with schedule |
| abnormal stop | device defect |
|  | model defect |
|  | changing model |
|  | waiting for materials |
|  | cleaning model |
|  | changing materials/color |
|  | adjusting production |
| uncertainty | communication defect |
| waiting | finished producing |
|  | no arrangement |
|  | testing machine/model |

The central management unit 20 further comprises a programmable judgment and protection device 206 which can ensure the credibility and stability of the system and correct any inaccurate information obtained by human input. The programmable judgment and protection device 206 includes a protection function for preventing the shop floor information collector 108 from sending incorrect information. The protection function includes means for making the shop floor information collector 108 invalid when the production line is working or when the on/off button of the shop floor information collector 108 is switched off. The protection function further includes self-examination of the network 2 and the information collecting computer 102.

Figure 5:
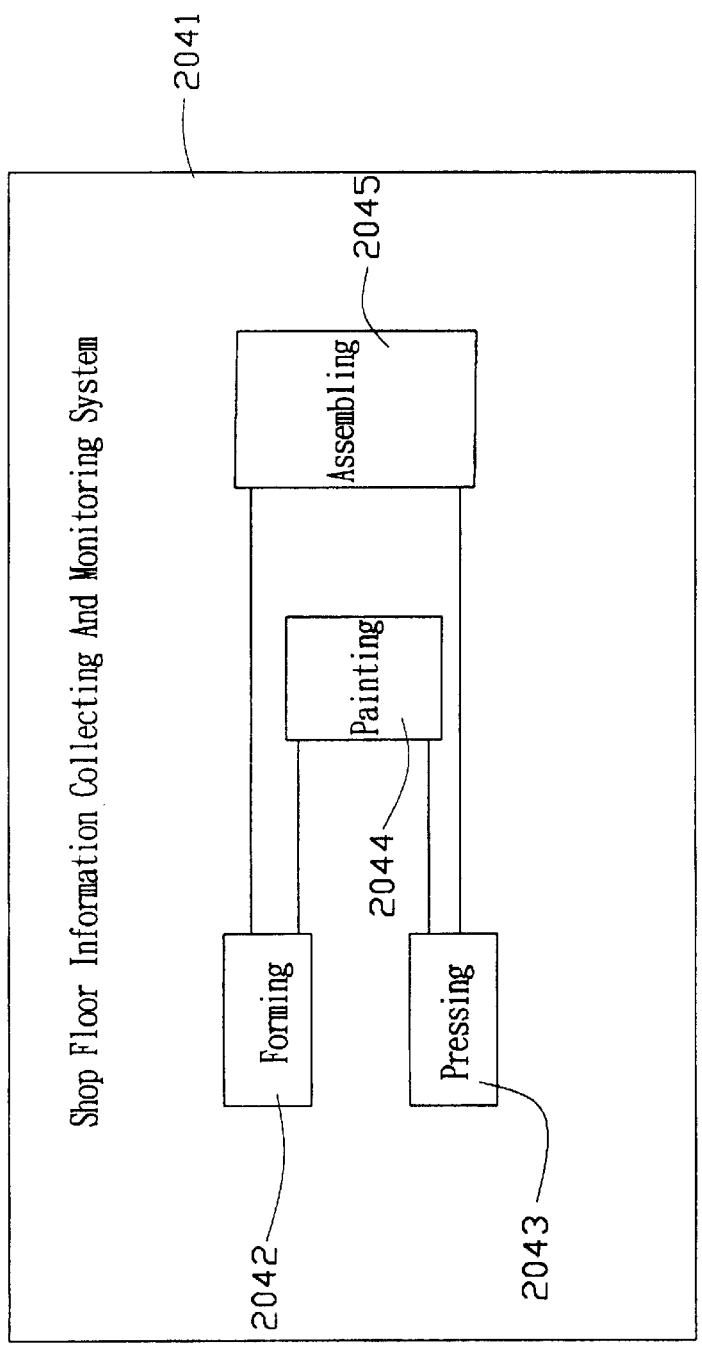
FIG. 5 is an illustrative view of a main computer display of an interface of the central management unit of FIG. 4.

The central management unit 20 further comprises an interface 204 by which an operator can search for and obtain real time information and updated data. The interface 204 comprises a main computer display 2041, details of which are shown in FIG. 5. The main computer display 2041 may include a plurality of processes that are defined in accordance with actual requirements. In practice, the processes commonly include pressing 2043, forming 2042, painting 2044 and assembling 2045 steps. Each such step is shown in a corresponding block on the main computer display 2041. The operator can access the relevant data by clicking on the blocks using a computer cursor and a mouse.

The interface 204 further comprises a concurrent data display 2046, details of which are shown in FIG. 6. The concurrent data display 2046 shows a set of information including working machine code, product code, product name, planning output, real time output, machine status, and working status.

Figure 7:
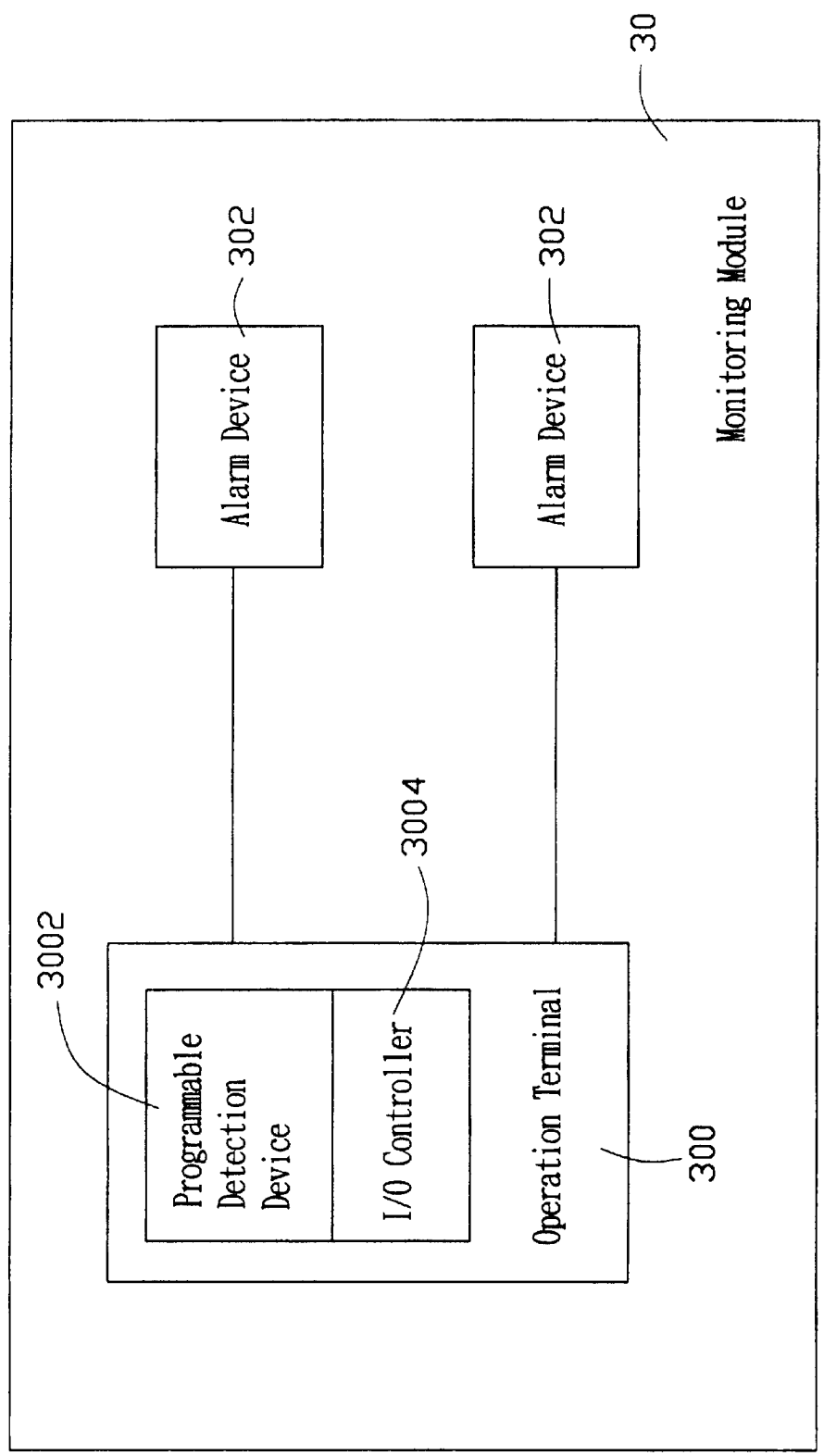
FIG. 7 is a schematic diagram of a monitoring module of the system of FIG. 1.

FIG. 7 is a block diagram of the monitoring module 30 shown in FIG. 1. The monitoring module 30 comprises an operation terminal 300, and a plurality of alarm devices 302 that are located in a repair station. The operation terminal 300 includes a programmable detection device 3002 and an I/O controller 3004. The monitoring module 30 connects with the central management unit 20 via the communication network 2 (see FIG. 1). While the database 202 in the central management unit 20 is being updated, the programmable detection device 3002 automatically detects whether the updated data show any defects in the processes shown on the main computer display 2041 or any defects in the working machines 107. When the updated data show that there is a defect in a process or a working machine 107, the programmable detection device 3002 automatically produces an alarm signal and transmits it via the I/O controller 3004 to the alarm devices 302 in the repair station.

Figure 8:
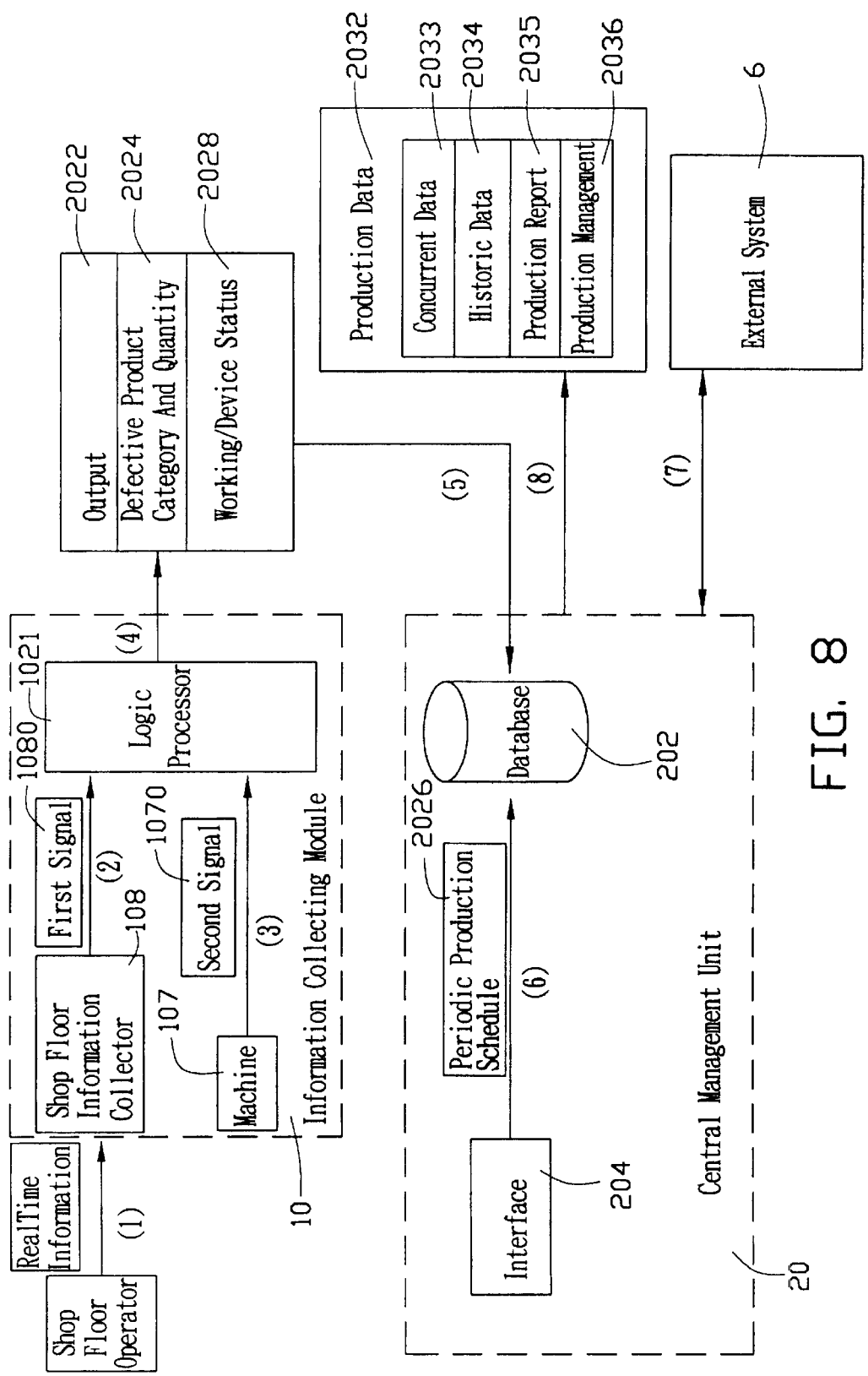
FIG. 8 is a flowchart showing information flow of the system of FIG. 1.

FIG. 8 is a flowchart showing information flow of the present invention, comprising the following steps:

(1) a shop floor operator manually inputs real time information into the shop floor information collector 108 in accordance with the present status of the shop floor.

(2) the shop floor information collector 108 produces a first signal 1080 that includes defective product category and quantity, working status and device status.

(3) the working machine 107 automatically produces a second signal 1070 that shows real time output of the working machine 107 obtained from an automated counter or similar device.

(4) the logic processor 1021 in the information collecting module 10 translates the received first and second signals 1080, 1070 into computer-readable data including output 2022, defective product category and quantity 2024, and working status and device status 2028.

(5) the computer-readable data are transmitted into and stored in the database 202 of the central management unit 20.

(6) a work planner manually inputs data of the periodic production schedule 2026 into the database 202 via the interface 204.

(7) the central management unit 20 interchanges data with the external system 6.

(8) the client 5 obtains the production data 2032 from the central management unit 20. The production data 2032 include concurrent data 2033, historic data 2034, production report 2035 and production management 2036.

The embodiment described herein is merely illustrative of the principles of the present invention. Other arrangements and advantages may be devised by those skilled in the art without departing from the spirit and scope of the present invention. Accordingly, the present invention should be deemed not to be limited to the above detailed description but rather by the spirit and scope of the claims which follow, and their equivalents.

What is claimed is:

1. An information collecting and monitoring system for collecting and monitoring real time shop floor information, the information collecting and monitoring system comprising:

a real time information collector far producing a first signal about production procedure and working status at each of shop floors;

a working machine that can automatically produce a second signal;

an information collecting computer that is connected with said real time information collector and said working machine and that automatically converts said first signal and said second signal into computer-readable data;

a monitoring module for monitoring shop floor information and outputting an alarm;

a central management unit for storing and processing the computer-readable data, said central management unit including an interface that enables an operator to manually input periodic production schedule information and allows the operator to search for and obtain information therefrom, said central management unit also including means for automatically producing related data tables and a database storing received information including real time output, working status and periodic production schedule data; wherein said central management unit includes a programmable judgment and protection device which ensures the credibility and stability of the system and corrects any inaccurate information obtained by human input.

2. The information collecting and monitoring system as claimed in claim 1, wherein said first signal includes information about defective products.

3. The information collecting and monitoring system as claimed in claim 1, wherein said production procedure and working status provided by said real time information collector includes items selected from the group consisting of: cleaning models, waiting for materials, changing color, changing materials, changing models, repairing models, and repairing machines.

4. The information collecting and monitoring system as claimed in claim 1, wherein said real time information collector and said working machine are scalable in numbers.

5. The information collecting and monitoring system as claimed in claim 1, wherein said information collecting computer includes a logic processor which translates said first signal and said second signal into computer-readable data.

6. The information collecting and monitoring system as claimed in claim 1, wherein said monitoring module includes a programmable detection device, and while said database in said central management unit is being updated, said programmable detection device can automatically detect whether the updated data show any defects in the working machine, and when the updated data shows that there is a defect in the working machine, said programmable detection device can automatically produce an alarm signal.

7. The information collecting and monitoring system as claimed in claim 6, wherein said monitoring module further includes an alarm device for indicating error on the working machine.

8. The information collecting and monitoring system as claimed in claim 7, wherein said monitoring module further includes an I/O controller by which said programmable detection device transmits the alarm signal to said alarm device.

9. The information collecting and monitoring system as claimed in claim 1, further comprising a communication network which connects said central management unit with an external system and enables information interchange therebetween.

10. The information collecting and monitoring system as claimed in claim 9, wherein said communication network includes an intranet.

11. An information collecting and monitoring method for collecting and monitoring real time shop floor information, the method comprising the following steps:
    providing a real time information collector for producing a first signal about production procedure and working status at each of shop floors;
    providing a working machine that can automatically produce a second signal;
    providing an information collecting computer that is connected with said real time information collector and said working machine and that automatically converts said first signal and said second signal into computer-readable data;
    providing a monitoring module for showing real time defects at the shop floors and outputting an alarm;
    providing a central management unit for storing and processing the computer-readable data, said central management unit including an interface that enables an operator to manually input periodic production schedule information and allows the operator to search for and obtain information therefrom, said central management unit also including means for automatically producing related data tables and a database storing received information including real time output, working status and periodic production schedule data; wherein
    said central management unit includes a programmable judgment and protection device which ensures the credibility and stability of the system and corrects any inaccurate information obtained by human input.

12. The information collecting and monitoring method as claimed in claim 11, wherein said first signal includes information about defective products.

13. The information collecting and monitoring method as claimed in claim 11, wherein said production procedure and working status provided by said real time information collector includes items selected from the group consisting of: cleaning models, waiting for materials, changing color, changing materials, changing models, repairing models, and repairing machines.

14. The information collecting and monitoring method as claimed in claim 11, wherein said real time information collector and said working machine are scalable in numbers.

15. The information collecting and monitoring method as claimed in claim 11, wherein said information collecting computer includes a logic process unit which translates said first signal and said second signal into computer-readable data.

16. The information collecting and monitoring method as claimed in claim 11, wherein said monitoring module includes a programmable detection device, and while said database in said central management unit is being updated, said programmable detection device can automatically detect whether the updated data show any defects in the working machine, and when the updated data shows that there is a defect in the working machine, said programmable detection device can automatically produce an alarm signal.

17. The information collecting and monitoring method as claimed in claim 16, wherein said monitoring module further includes an alarm device for indicating error on the working machine.

18. The information collecting and monitoring method as claimed in claim 17, wherein said monitoring module further includes an I/O controller by which said programmable detection device transmits the alarm signal to said alarm device.

19. The information collecting and monitoring method as claimed in claim 11, further providing a communication network which connects said central management unit with an external system and enables information interchange therebetween.

20. The information collecting and monitoring method as claimed in claim 16, wherein said communication network includes an intranet.

* * * * *